(12) United States Patent
Turney

(10) Patent No.: US 6,470,307 B1
(45) Date of Patent: Oct. 22, 2002

(54) METHOD AND APPARATUS FOR AUTOMATICALLY IDENTIFYING KEYWORDS WITHIN A DOCUMENT

(75) Inventor: Peter D. Turney, Gloucester (CA)

(73) Assignee: National Research Council of Canada, Ottawa (CA)

(*) Notice: Subject to any disclaimer, the term of this patent is extended or adjusted under 35 U.S.C. 154(b) by 0 days.

(21) Appl. No.: 08/880,392

(22) Filed: Jun. 23, 1997

(51) Int. Cl.[7] .............................................. G06F 17/27
(52) U.S. Cl. .................................... 704/9; 707/531
(58) Field of Search .................... 704/1, 9; 707/530, 707/531

(56) References Cited

U.S. PATENT DOCUMENTS

| | | | | |
|---|---|---|---|---|
| 4,965,763 A | * | 10/1990 | Zamora | 704/9 |
| 5,020,019 A | * | 5/1991 | Ogawa | 704/9 |
| 5,077,668 A | * | 12/1991 | Doi | 704/1 |
| 5,251,129 A | * | 10/1993 | Jacobs et al. | 704/8 |
| 5,278,980 A | * | 1/1994 | Pedersen et al. | 704/9 |
| 5,297,042 A | * | 3/1994 | Morita | 704/9 |
| 5,371,807 A | * | 12/1994 | Register et al. | 704/7 |
| 5,384,703 A | * | 1/1995 | Withgott | 704/9 |
| 5,418,951 A | * | 5/1995 | Damashek | 704/9 |
| 5,745,602 A | * | 4/1998 | Chen et al. | 707/531 |
| 5,778,397 A | * | 7/1998 | Kupiec | 704/9 |
| 6,047,277 A | * | 4/2000 | Parry et al. | 706/20 |
| 6,128,613 A | * | 10/2000 | Wong et al. | 707/7 |
| 6,137,911 A | * | 10/2000 | Zhilyaev | 382/225 |

OTHER PUBLICATIONS

Cavnar et al., "N–GRAM Based Text Categorization" Iternational Symposium on Document Analysis and Information Retrieval 1994, p. 1–15.*

Kupiec, J., et al "A trainable document summarizer" Proceeding of the 18th Annual International Acm Conference, 95, pp.68–73.*

Paice, C.D., et al "The Identification of Important Concepts In Highly Structured Technical Papers" roceeding of the 16 th Annual International ACMConference, 93, pp. 69–78.*

Clack, C., Farringdon, J., et al., "An Adaptive Document Classification Agent," Internet: Home Page of J. Farringdon at Department of Computer Science, University College London, Jun. 19, 1996, XP–002077092 (http://www.cs.ucl.ac.uk/j.farringdon).

Farringdon, J., "Genetic Programming & Information Filtering: Working Notes," Internet: Home Page of J. Farringdon at Department of Computer Science, University College London, Feb. 28, 1996, XP–002077090 (http://www.cs.ucl.ac.uk/j/farringdon).

Sonderland, S., Lehnert, W., "Wrap–Up: A Trainable Discourse Module for Information Extraction," *Journal of Artificial Research*, vol. 2, 1994, pp. 131–158, XP–002077091.

* cited by examiner

*Primary Examiner*—Patrick N. Edouard
(74) *Attorney, Agent, or Firm*—Freedman & Associates

(57) ABSTRACT

A trainable method of extracting keywords of one or more words is disclosed. According to the method, every word within a document that is not a stop word is stemmed and evaluated and receives a score. The scoring is performed based on a plurality of parameters which are adjusted through training prior to use of the method for keyword extraction. Each word having a high score is then replaced by a word phrase that is delimited by punctuation or stop words. The word phrase is selected from word phrases having the stemmed word therein. Repeated keywords are removed. The keywords are expanded and capitalisation is determined. The resulting list forms extracted keywords.

19 Claims, 5 Drawing Sheets

METHOD AND APPARATUS FOR AUTOMATICALLY IDENTIFYING KEYWORDS WITHIN A DOCUMENT

FIELD OF THE INVENTION

This invention relates to trainable methods and apparatus for automatically identifying keywords in a document, by using stop words to delimit phrases.

BACKGROUND OF THE INVENTION

After documents are prepared, there is often a need to generate a list of keywords and phrases that represent the main concepts described therein. For example, academic documents such as technical papers, journal articles and the like typically have an accompanying list of keywords and phrases that can be utilised by a reader as a simple summary of the document or for use in searching and locating articles. As of late, with an increased popularity and use of the Internet, there is an even greater requirement to provide keyword lists of electronic documents to facilitate searching for a document.

Currently, the following four methods are used for generating keywords:

1. Keywords are generated manually, by the author of the document or by a person skilled in indexing documents.

2. Keywords are generated automatically by listing the most frequent words in a document excluding stop words such as very common frequently occurring words such as "and", "if", and "have".

3. Keywords are generated automatically by first automatically tagging the words in the document by their part-of-speech, such as noun, verb, adjective, etc., and then listing the most frequent noun phrases in the document.

4. Keywords are generated automatically by selecting those words from a document that belong to a predetermined set of indexing terms. This method requires a list of thousands of indexing terms specific to a particular field.

Of course manual keyword or phrase generation is highly labour intensive. Moreover, a person skilled in indexing documents is likely required to have some knowledge of the terms and understanding of the particular subject matter being indexed.

Listing the most frequent words in the document with the exception of stop words usually results in a relatively low-quality list of keywords, especially in comparison with manual keyword or phrase generation. Single words are often less informative than two or three-word phrases.

Part-of-speech tagging requires a lexicon of usually several tens of thousands of words, and such lexicons have to be provided for each target language.

Most part-of-speech taggers also require a large body of training text, in which every word has been manually tagged. While the quality of the keyword list generated by this method is superior to the second method above, the quality of the list of keywords remains inferior to the manual method of keyword and phrase generation. A limitation of a lexicon of target keywords is that it requires a list of thousands of indexing terms. The list of indexing terms must be kept up-to-date and will be specific to a certain field (e.g., law, biology, chemistry, etc.). Building and maintaining such a list is very labour intensive.

Of the three methods that are currently used for automatically generating keywords, part-of-speech tagging tends to yield the best results. This method has two basic steps. First, potential keywords are identified by tagging words according to their part-of-speech and listing noun phrases. Second, keywords are determined by selecting the most frequent noun phrases. A limitation of this method is that it uses a strong method for identifying potential keywords, but a weak method for selecting keywords from the list of candidates.

In view of the limitations of the prior art methods of keyword generation, it is an object of this invention to provide a method and means for automatically generating keywords, that overcomes many of these limitations.

It is a further object of this invention to provide a fast and relatively efficient method of generating keywords from an electronically stored document.

It is yet a further object of the invention to provide a method and system for generating a plurality of keywords from an electronic stored document wherein the system is trainable by using a training data set independent of the document.

SUMMARY OF THE INVENTION

In accordance with the invention, there is provided, a method of generating a plurality of keywords from an electronic, stored document including phrases, stop words delimiting the phrases, and punctuation. A computer is used to select from the document raw phrases of one or more contiguous words excluding stop words, by utilising stop words, or stop words and punctuation, to determine raw phrases to be selected. The step of selecting raw phrases is performed in the absence of part-of-speech tagging and a lexicon of target keywords. The computer then uses a form of the raw phrases to generate the plurality of keywords.

The features used for evaluating the raw phrases include a frequency of the raw phrase occurrence within the document; a measure of closeness to a starting portion of the document; and, a length of the raw phrase.

In accordance with the invention there is further provided a method of generating a plurality of keywords from an electronic, stored document including phrases, stop words delimiting the phrases, and punctuation. A computer is used to select from the document, raw phrases comprised of one or more contiguous words excluding stop words. A form of the raw phrases is used to generate the plurality of keywords in dependence upon a plurality of weighted criteria, wherein weights for the criteria are determined by a step of training. For example, the step of training is performed by providing a training document; providing a set of keywords that are dependent upon the training document; providing a set of weights that are independent of the training document; performing keyword extraction on the training document; comparing the generated keywords with the provided keywords; and then modifying the weightings for the criteria and repeating the step of training until the comparison is within predetermined limits. For example, training may be performed with a genetic algorithm and weights may be stored in a decision tree.

In accordance with the invention there is provided a method of generating a plurality of keywords from an electronic, stored document including phrases, stop words delimiting the phrases, and punctuation. A first list of words within the document that are not stop words are generated. Each word in the list is evaluated to determine a score in dependence upon a plurality of indicators and weights for each indicator, scores for different words in the list determined using same indicators and same weights. The list of words is ordered in dependence upon the scores. For each word in the list, all raw phrases of one or more words containing a word having a predetermined similarity are selected and a score for each selected word phrase is determined. Then the word in the list is replaced with a most desirable word phrase comprising a word having a predetermined similarity.

Advantageously, the invention provides a method and system wherein training data sets are provided comprising documents and keywords for analysis, so that training of the system may occur. Once particular information is gleaned from the preferred training set, the system in accordance with this invention performs similarly, after analysing/learning from the training data set.

DETAIL DESCRIPTION OF THE INVENTION

Figure 1:
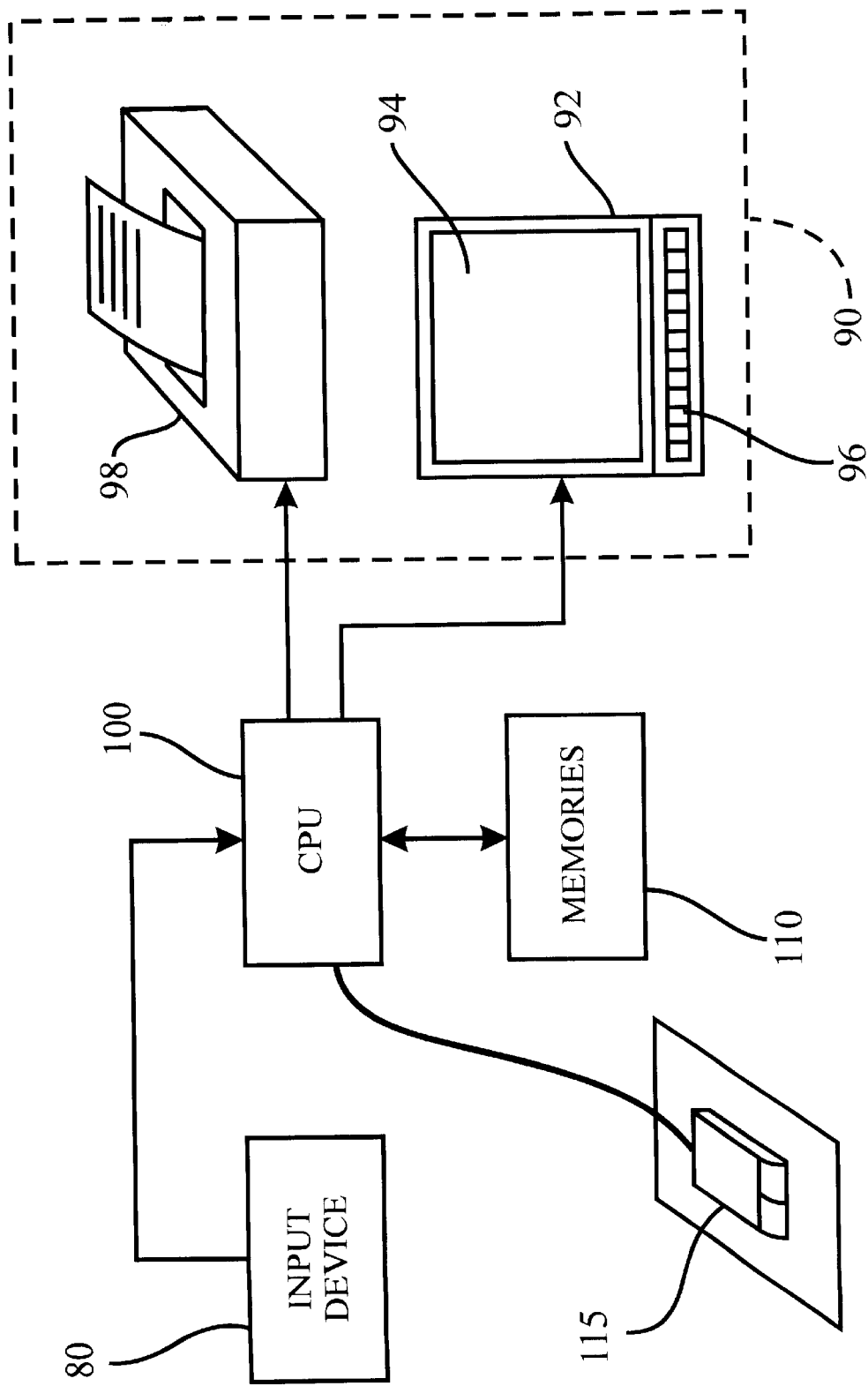
FIG. 1 is a block diagram of a system for performing the method of the invention.

Referring now to FIG. 1 the keyword generation system and method is performed either on an electronic bitmap image of the an original document or on a document stored as character codes, for example, ASCII data. The method is performed on a digital computer 100 that uses procedures stored in memory 110. The electronic document is input into the computer by input device 80. The input device 80 can be a disk drive, a modem, a scanner or facsimile with accompanying OCR software. The keyword list is provided to an output device 90, in the form of a printer 98 or output display 92.

Figure 2:
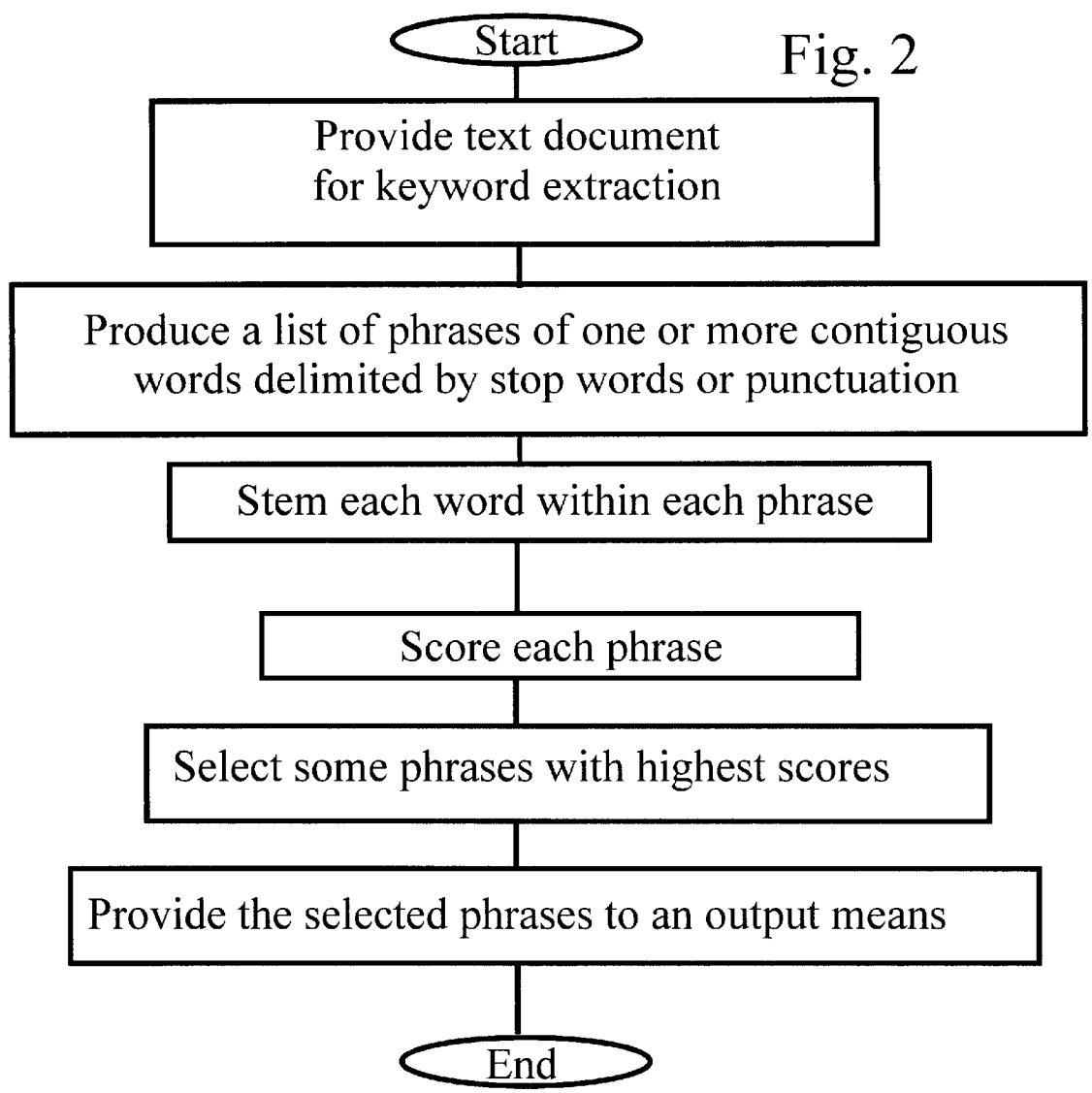

Referring now to FIG. 2, a simplified flowchart is shown illustrating an embodiment of the invention. An initialisation step is performed wherein a document for analysis is input and stored in memory 110. The document is operated upon by an extractor, in the form of a plurality of procedures stored in memory comprising a plurality of computer coded instructions.

The extractor is provided with a text file of the document as input data and generates a list of keywords comprising words and phrases as output. The output keywords are intended to serve as a "short-summary" of the input text file or as a list of words and phrases for facilitating locating the document. Throughout this specification the term keyword refers to a keyword having one or more words and includes keyphrases.

Figure 4:
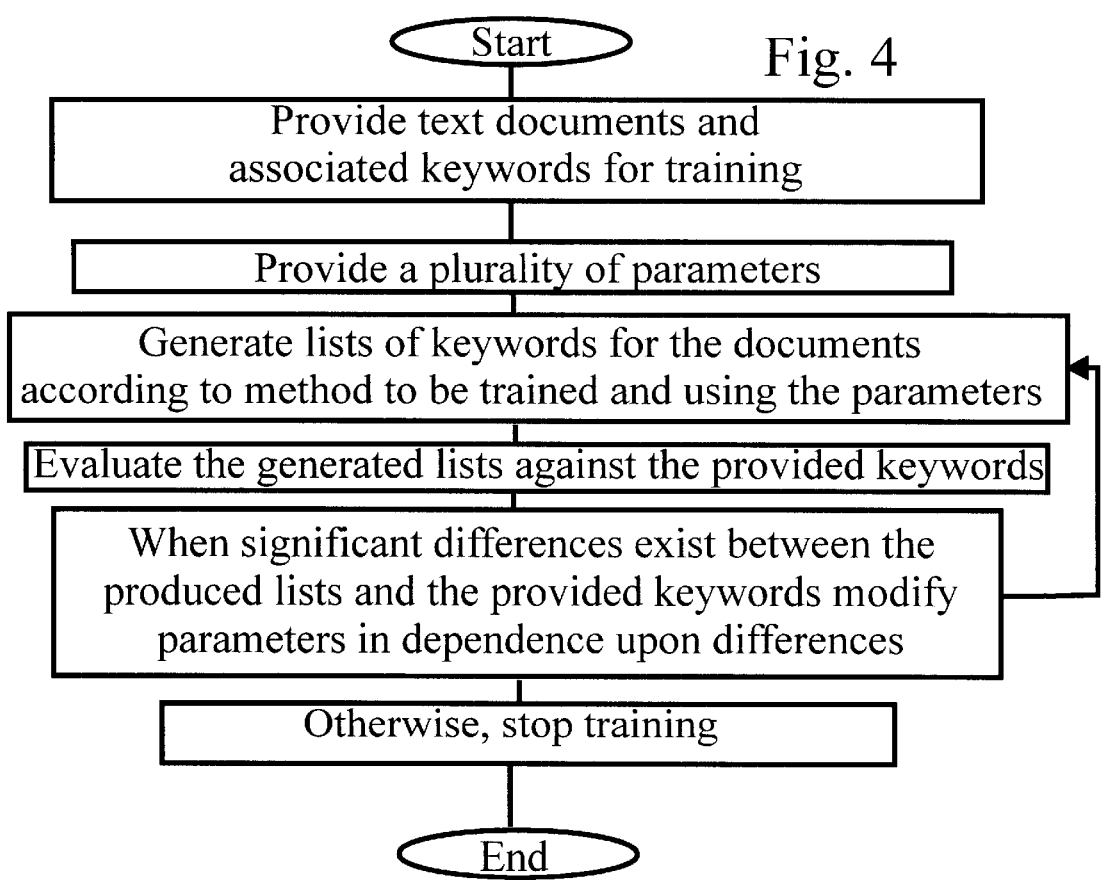
FIG. 4 is a simplified flow diagram of a method of training a keyword extraction system according to the invention; and, FIG. 5 is a simplified flow diagram of a method of training a keyword extraction system using a genetic algorithm according to the invention.

In a preferred embodiment of this invention, the extractor has twelve parameters that determine how the input text from document is processed. These twelve parameters are determined and set using a standard machine learning paradigm of supervised learning. Referring to FIG. 4, a simplified flow diagram of a method of training a keyword extraction system according to the invention is shown. The method employs a genetic algorithm for this purpose and is described in more detail hereinbelow. The extractor is tuned with a data set comprising documents paired with target lists of keywords supplied by the author of the documents. The data set is easily assembled by referring to existing documents in a same field as that in which the method is to be employed, and selecting some documents and associated keywords. Since a human compiled list of keywords is generally the best, it is preferable to use such a list for training the system. Thus, the learning process involves adjusting the twelve parameters, described hereafter in greater detail, to maximise the match between the output of the algorithm and the target keyword lists—those keywords provided with the training data. The success of the learning process is measured in accordance with a match of generated keywords with the training data.

A description follows of how the twelve parameters are tuned, including a description of the core algorithm of the extractor and the functions of the parameters.

The twelve parameters in the extractor are tuned by the Genitor genetic algorithm (Whitley, D. (1989), The GENITOR algorithm and selective pressure, Proceedings of the Third International Conference on Genetic Algorithms (ICGA-89), Morgan Kaufmann, pp. 16–121), to maximise performance using the training data. The performance measure—F-measure—is based on precision and recall:

number of machine phrases=number of phrases output by the extractor number of target phrases=number of keywords associated with a same document from the training data set precision=number of matches between the generated keywords and those supplied with the training data set/ number of machine phrases recall=number of matches between the generated keywords and the keywords supplied with the training data set/number of target phrases F-measure=(2*precision*recall) (precision+recall)

A phrase generated by the extractor is said to "match" a phrase in the target list when the two phrases contain the same sequence of stems. A "stem" is a word having no suffix or a word with its suffix removed. For the matching algorithm, preferably, a different stemming algorithm is used than for keyword generation.

Each target keyword is allowed to match at most one machine keyword; for example,

| Machine Keywords | Target Keywords |
|---|---|
| evolutionary psychology | evolutionary psychology |
| evolutionary psychologist | sociobiology |
| Machine Stemmed Keywords | Target Stemmed Keywords |
| evolut psycholog | evolut psycholog |
| evolut psycholog | sociobiolog |

Although either "evolutionary psychology" or "evolutionary psychologist" matches the target "evolutionary psychology"—they all correspond to the sequence of stems "evolut psycholog," this is counted as only one match. This prevents overvaluing extracted keywords when stemming fails to identify two words having a same stem.

Genitor is used to train the extractor by substantially optimising values of the 12 parameters; Genitor is not used during keyword generation as the training process is complete. When the optimal parameter values are known, Genitor need not be used. Referring again to FIG. 3, the method of extracting keywords is further explained below.

The following is a list of the 12 parameters, with a brief description of each of them. The meaning of the entries in the table is clarified with an understanding of the algorithm.

| | Parameter | Sample Value | Description |
|---|---|---|---|
| 1 | NUM_PHRASES | 10 | maximum length of final phrase list |
| 2 | NUM_WORKING | 60 | maximum length of working list |
| 3 | FACTOR_TWO_ONE | 5 | factor for weighting two word phrases |
| 4 | FACTOR_THREE_ONE | 3.33 | factor for weighting three word phrases |
| 5 | MIN_LENGTH_LOW_RANK | 0.9 | low rank words must be longer than this |
| 6 | MIN_RANK_LOW_LENGTH | 5 | short words must rank higher than this |
| 7 | FIRST_LOW_THRESH | 40 | definition of "early" occurence |
| 8 | FIRST_HIGH_THRESH | 400 | definition of "late" occurrence |
| 9 | FIRST_LOW_FACTOR | 2 | reward for "early" occurrence |
| 10 | FIRST_HIGH_FACTOR | 0.65 | penalty for "late" occurrence |
| 11 | STEM_LENGTH | 5 | maximum characters for fixed length stem |
| 12 | ADJECTIVE_PENALTY | 0.1 | penalty for adjectival endings |

The Alogorithm The extractor executes the following steps. First, stems of single words, excluding stop words, are extracted and for each, a score is determined. The stems are ranked in accordance with their scores, from most desirable score to least desirable score. Stem phrases of one or more words are then extracted and scored in a similar fashion to the stems of single words. Additional parameters allow for emphasis on longer phrases or phrases of predetermined lengths. The stems of single words are "expanded" by replacing a stem of a single word with a highest scoring stem phrase comprising the stem. Duplicates are removed from the list and suffixes are added using a suffix adding procedure. A more detailed description of the procedures followed by the extractor follows.

1. FIND STEMS OF SINGLE WORDS: A list of all of the words in the input text is compiled. Words with less than three characters are removed from the list, as are stop words (words like "and", "but", "nor", "from", "she", . . . ), using a predetermined stop word list. All characters in the remaining words are converted to lower case characters. Each word is stemmed by truncation, leaving at most the first STEM_LENGTH characters. Stemming by truncation is quite aggressive and appears to improve system performance. Stemming by truncation is also faster than other common stemming algorithms.

2. SCORE STEMS OF SINGLE WORDS: For each unique stem, a tally of frequency of stem occurrence in the text and a first appearance location is recorded. For example, when a stem "evolut" is within the list of stems and first appears in the tenth word in the text, "Evolution," the first appearance of "evolut" is in position 10.

A score is determined and associated with each stem in the list of stems. The score is determined as the number of occurrences of the stem multiplied by a default factor to produce a stem weight. In the present embodiment, the factor is 1. Other factors are used when desirable. When a factor of 1 is used, no multiplication is performed because of the mathematical properties of 1.

Four parameters are used to further effect the factor. These provide additional factors for determining stem scores occurring early or late within the text. Of course, when the default factor is 1, the additional factors are the only factors and are only applied when desirable. When a stem's first position is before FIRST_LOW_THRESH, then the stem score is multiplied by FIRST_LOW_FACTOR. When a stem's first position is after FIRST_HIGH_THRESH, then the stem score is multiplied by FIRST_HIGH_FACTOR. Typically, FIRST_LOW_FACTOR is greater than one and FIRST_HIGH_FACTOR is less than one. When FIRST_LOW_THRESH is equal to FIRST_HIGH_THRESH or they differ by 1 or less, no factor other than FIRST_LOW_FACTOR and FIRST_HIGH_FACTOR is used since all positions are within positions requiring a multiplier—FIRST_LOW_FACTOR or FIRST_HIGH_FACTOR 3. SELECT TOP SCORING STEMS OF SINGLE WORDS: The stems are ranked in order of decreasing score. The first NUM_WORKING or fewer stems of single words are selected as a working list of stems.

4. FIND STEM PHRASES: A list is made of all phrases in the input text. A phrase is defined as a sequence of one or more words that appear consecutively in the text with no intervening stop words or sentence boundaries. Optionally, phrases are limited to less than a predetermined number of words. In the preferred embodiment, phrases are limited to three or fewer words. Characters in the phrases are all converted to lower case characters as necessary. Each phrase is stemmed by truncating each word in the phrase to at most STEM_LENGTH characters. Truncation of words within phrases has similar advantages to those set out with reference to truncation of single words. The stems of each word in a phrase are formed into stem phrases. For example, "Psychological Association decision" becomes a stem phrase of "psych assoc decis" when STEM_LENGTH is 5.

5. SCORE STEM PHRASES: For each stem phrase, a count is stored of how often the stem phrase appears in the text and a position where the stem first occurs. A score is assigned to each stem phrase, analogously to the method of step 2 and using the parameters FIRST_LOW_FACTOR, FIRST_LOW_THRESH, FIRST_HIGH_FACTOR, and FIRST_HIGH_THRESH. Once each stem phrase is associated with a score, an adjustment is made to each score, based on the number of stems in the associated phrase.

When there is a stem of a single word in a phrase, nothing is done. When there are stems of two consecutive words in a phrase, the associated score is multiplied by FACTOR_TWO_ONE. When there are stems of three consecutive words in the phrase, the associated score is multiplied by FACTOR_THREE_ONE. Typically FACTOR_TWO_ONE and FACTOR_THREE_ONE are greater than one, the latter being greater than the former; this increases the score of longer phrases. A stem phrase necessarily never occurs more frequently than the least frequent stem of a single word contained in the phrase. The factors FACTOR_TWO_ONE and FACTOR_THREE_ONE increase scores of longer phrases, to compensate for the fact that longer phrases are expected to otherwise have lower scores than shorter phrases.

6. EXPAND STEMS OF SINGLE WORDS: For each stem in the list of the top NUM_WORKING or fewer stems of single words, the highest scoring stem phrase of one or more words that contains the stem of the single word is determined and is stored replacing the stem of the single word. The result is a list of NUM_WORKING stem phrases. This list is ordered by the scores calculated in step 2 for the stem of the single word contained within the stem phrase. After the stems of single words have been replaced by stem phrases, there is no more need for the scores that were calculated in step 5. That is, the score for a corresponding stem of a single word that a stem phrase replaced is used to score the stem phrases within the list. The list of stem phrases and stem phrase scores determined in steps 4 and 5 above are discarded and the memory associated therewith is freed.

7. REMOVE DUPLICATES: The list of the top NUM_WORKING or fewer stem phrases may contain duplicates. For example, two stems of single words may expand to the same two-word stem phrase. Duplicates are deleted from the ranked list of NUM_WORKING stem phrases, preserving the highest ranked phrase. For example, if "evolu psych" appears in the fifth and tenth positions in the list, then the phrase in the tenth position is removed. The resulting list likely has fewer than NUM_WORKING stem phrases.

8. ADD SUFFIXES: For each of the stem phrases remaining in the list, the highest scoring corresponding phrase with suffixes and in the input text is found. One scoring system determines a number of occurrences of the phrase in the text. For example, when "evolutionary psychology" appears ten times in the text and "evolutionary psychologist" appears three times, then "evolutionary psychology" is the more frequent corresponding whole phrase for the stem phrase "evolu psych". Optionally, when counting the frequency of occurrences of whole phrases, a score corresponding with a phrase having an ending indicating that it is possibly an adjective—"al", "ic", "ly", etc.—is adjusted by multiplying the score by ADJECTIVE_PENALTY. Typically ADJECTIVE_PENALTY is less than one; this decreases the score of the phrase. Adjectives in the middle of a phrase (for example, the second word in a three-word phrase) do not result in adjustment of the phrase score. For example, the one-word phrase "psych" may appear ten times in the text as "psychological" and three times as "psychology;" when ADJECTIVE_PENALTY is 0.1, a score of 3 results for "psychology" and only 1 (10*0.1) for "psychological;" "psychology" is selected.

9. ADD CAPITALISATION: For each of the whole phrases, capitalisation is determined. A method of capitalisation is as follows. For each word in a phrase, the capitalisation with the least number of capitals is found. For a one-word phrase, this is the best capitalisation. For a two-word or three-word phrase, this is the best capitalisation when the capitalisation is consistent. The capitalisation is said to be inconsistent when one of the words has the capitalisation pattern of a proper noun—for example, "Smith"—but another of the words does not appear to be a proper noun—for example, it ends with "ed". When the capitalisation is inconsistent, the capitalisation with the second lowest number of capitals is analysed for consistency. When that is also inconsistent, the inconsistent capitalisation with the fewest capitals is used. When consistent, the consistent capitalisation having more capitals is used. For example, given the phrase "psychological association", the word "association" might appear in the text only as "Association", whereas the word "psychological" might appear in the text as "PSYCHOLOGICAL", "Psychological", and "psychological". Using the least number of capitals, we get "psychological Association", which is inconsistent; however, it is rendered consistent, as "Psychological Association".

10. FILTERING AND FINAL OUTPUT: A result of the above 9 steps is an ordered list of upper and lower case whole phrases—keywords. The list is ordered using the scores calculated in step 2. The length of the list is at most NUM_WORKING keywords, and is likely less as a result of step 7.

The list of keywords is filtered prior to provision to an output device in order to remove undesirable keywords. The following tests are examples of filtering of keywords.

Phrases having capitalisation indicative of a proper noun are removed from the list when proper nouns are undesirable in the final output keyword list.

Phrases having an ending indicative of an adjective are removed from the list when adjectives are undesirable in the final output keyword list. Alternatively, these phrases are filtered during the step of expanding the stems of single words to maintain non-adjective phrases corresponding to the stems of single words and within the document text.

Phrases shorter than MIN_LENGTH_LOW_RANK are removed from the list when their rank in the keyword list is below MIN_RANK_LOW_LENGTH and when it is unlikely that the phrase is an abbreviation. One method of evaluating phrase length is determining a ratio of the number of characters in the phrase to an average number of characters in all phrases in the input text that consist of one to three consecutive non-stop words. Likelihood of phrase abbreviation is evaluated by evaluating a capitalisation pattern of the phrase.

Of course, it is apparent to those of skill in the art that other parameters and criteria for scoring stems and stem phrases may be used in conjunction with or instead of those described herein.

Finally, the top ranked NUM_PHRASES keywords are provided as output. Preferably, NUM_PHRASES is less than NUM_WORKING.

Referring to FIG. 4, a simplified flow diagram of a method of training a keyword extraction system according to the invention is shown. The method accepts a data set comprising text documents and keywords for the documents. Keywords are extracted according to the method to be trained and during training extracted keywords are evaluated against the provided keywords. Parameters used during keyword extraction are modified based on the differences between the sets of keywords. When the differences are less than a predetermined threshold, the training stops and the parameters determined through training are used for keyword extraction. It is of note that training is most effective when the system is trained for documents of a certain type or in a certain academic field. For example, providing the training system with ten documents on natural language generation using a computer will likely produce parameters most effective in extracting keywords from articles on natural language generation.

Figure 3:
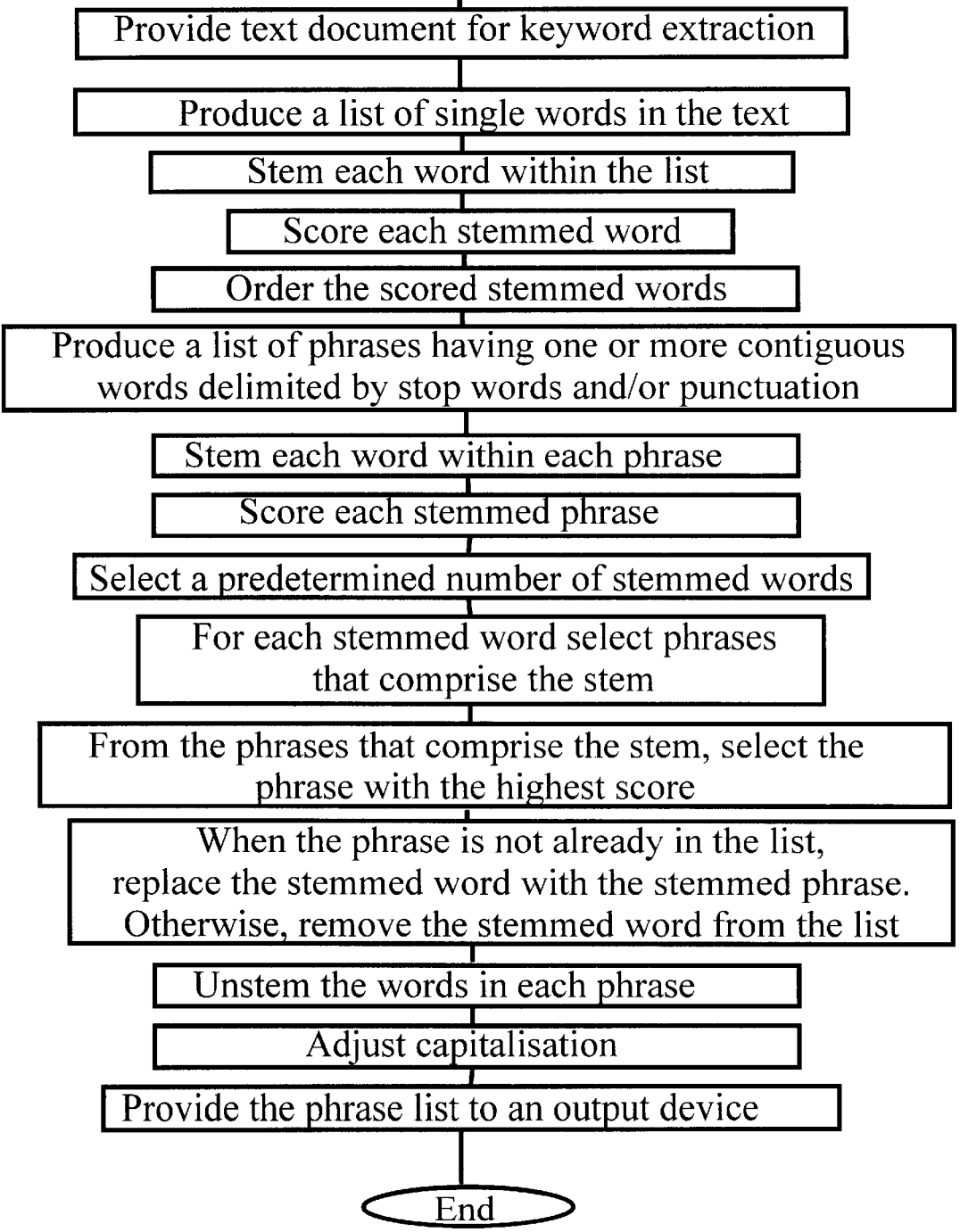
FIG. 3 is a simplified flow diagram of a method of extracting keywords form a text document according to the invention.
Figure 5:
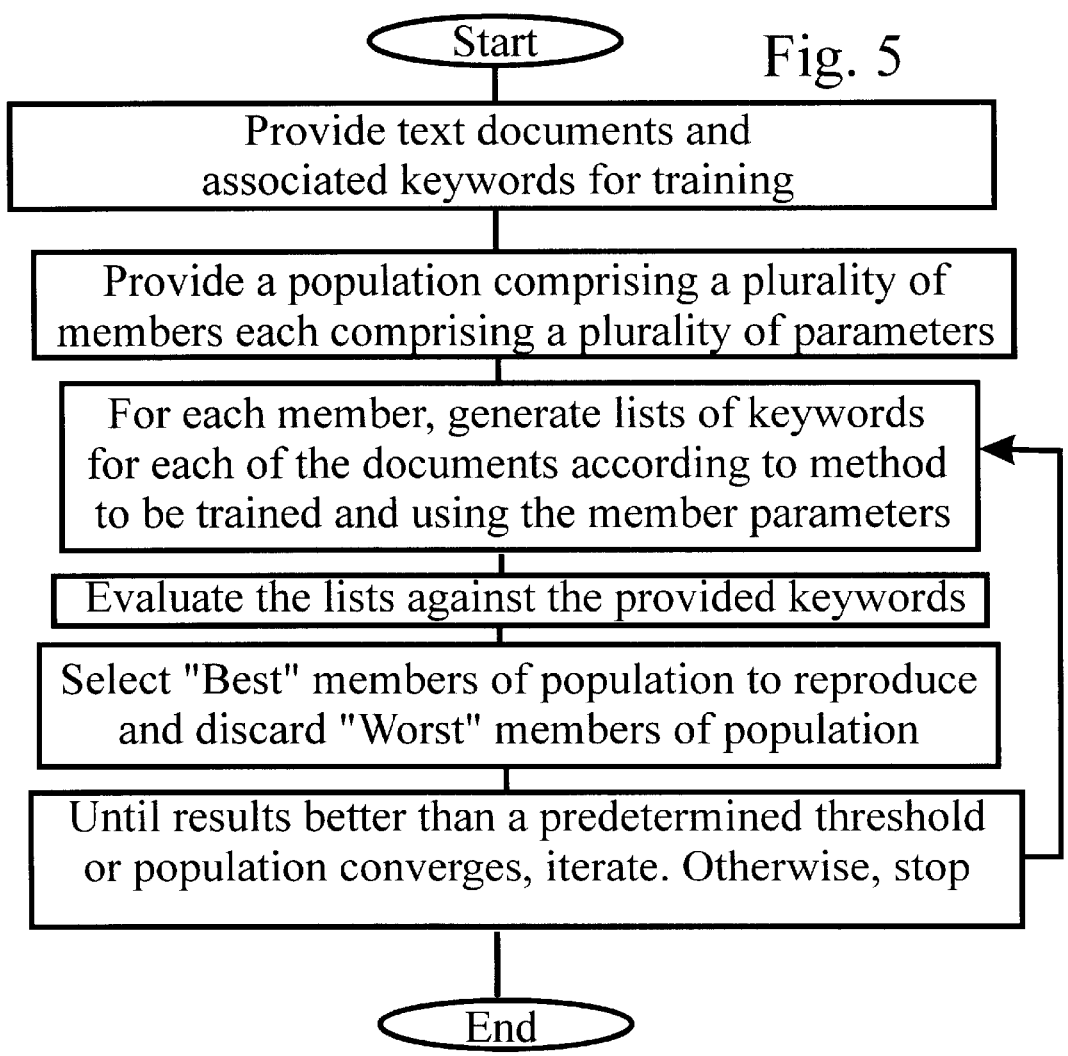

Referring to FIG. 5, a simplified flow diagram of a method of training a keyword extraction system according to the invention is shown. The method employs a genetic algorithm for this purpose. An initial population of parameter values are provided. As well, a training set comprising a sample training document and a list of author compiled keywords for that document is stored in memory. For each member of the population—set of parameter values—the method outlined with reference to FIG. 3 is executed and resulting keywords are analysed. The analysis results in a score for each extracted list of keywords. Preferably training is performed using a plurality of training documents, thereby resulting in a plurality of scores for each member of the population. Members in the population with least desirable scores are discarded. Least desirable scores are determined either as lowest average score or, alternatively, through a ranking system based on all scores.

Preferably, for analysis of the generated list of keywords, the Lovins (1968) stemming algorithm is used. The Lovins stemming algorithm is described in Lovins, J. B. (1968). "Development of a stemming algorithm", Mechanical Translation and Computational Linguistics, 11, 22–31. The Lovins stemming algorithm is repeatedly applied until no further characters are removed. The Lovins stemming algorithm is more aggressive than another common stemming algorithm—the Porter (1980) algorithm described in Porter, M. F. (1980). "An algorithm for suffix stripping", Program (Automated Library and Information Systems), 14 (3), 1307–7—and repeated application makes it even more so. This aggressiveness can result in distinct words appearing identical after stemming. For example, 'police' and 'policy' might both be stemmed to 'polic.' However, in practice, this is rarely a problem. It is more common for words that have the same stems to appear distinct, even after repeated applications of the Lovins stemming algorithm. For example, 'assembly' is stemmed to 'assemb', but 'assemblies' is stemmed to 'assembl.'

The use of a different stemming algorithm during evaluation from that used during keyword list generation allows a more objective comparison between keyword lists independent of variations in STEM_LENGTH and the effects those variations have on keyword generation. For example, the terms "psychology" and "psychological" match regardless of STEM_LENGTH. Of course it is evident to those of skill in the art that preferably, analysis of generated lists of keywords is performed independent of the method of generating the list of keywords.

As described above, the performance measure is the F-measure based on precision and recall. The resulting value of F-measure is determined for each list of keywords. Alternatively, the resulting value of F-measure is determined for all lists of keywords combined.

The removed members of the population are replaced with new members. These members are determined using common genetic algorithm techniques. One such technique mutates the highest scoring members of the population to produce the new members. Another technique, using several members to produce each new member is better suited to application where each member is ranked according to highest scores for a document. For example, when 3 documents are provided with associated keywords, each member is evaluated to determine keywords for each document. Members ranking highest for each document are selected thereby resulting in a selection of 1 to 3 members. The members are then combined and mutated to form a new population that includes the three members. Optionally, other high ranking members from the initial population are also maintained.

The process iterates until the population converges or begins to converge toward an "ideal member." This convergence, for example, may result from a number of successive generations in which a same member has the highest rank. Alternatively, it results from a population that has substantially similar members. It is apparent to those of skill in the art of genetic algorithms that the "ideal member" is not a true ideal member. The "ideal member" is the member within the population as it develops that is best fit for the predetermined task; here, the task is providing parameters for keyword generation. Depending on the initial population, a different "ideal member" may result.

Once an "ideal member" is selected, the parameters of the "ideal member" are used in the algorithm of FIG. 3. Training is complete and the algorithm is applied to documents for keyword extraction using those parameters. In practice, training is performed during installation and subsequent use of the method requires no further training. Of course, training is repeated when keyword extraction is not performed as well as desired.

Other methods of training the system may be employed. Further, other trainable systems such as neural networks are well suited to use for implementing the present invention. Numerous other embodiments of the invention are envisaged without departing from the spirit or scope of the invention.

What is claimed is:

1. A method of generating a plurality of human intelligible keywords from an electronic, stored document including phrases, stop words delimiting the phrases, and punctuation, the method comprising the steps of:

a) providing features selected to be indicative of word/phrase significance, providing a training document and a set of human intelligible keywords dependent upon the training document, and producing training results in dependence upon the document and the human intelligible keywords, the training results including parameter values indicative of feature weighting for weighting the provided features in order to determine a measure of word/phrase significance;

b) using a computer to select from the document raw phrases comprised of one or more contiguous words excluding stop words, by utilizing slop words, or stop words and punctuation, to determine raw phrases to be selected; and, c) using a form or the raw phrases, generating the plurality of human intelligible keywords by evaluating the selected raw phrases based on the provided features and the parameter values, wherein the step of selecting raw phrases is performed in dependence upon the training results and in the absence of part-of-speech tagging and a lexicon of target human intelligible keywords.

2. A method of generating a plurality of human intelligible keywords as defined in claim 1, wherein the step of using a form of raw phrases comprises the ordered steps of selecting a number of characters; and truncating words within the raw phrases to a length corresponding to the selected number of characters.

3. A method of generating a plurality of human intelligible keywords as defined in claim 1, comprising the step of, for at least some raw phrases, evaluating each of:

a frequency of the raw phrase occurrence within the document;

a measure of closeness to a starting portion of the document; and, a length of the raw phrase.

4. A method of generating a plurality of human intelligible keywords as defined in claim 1, wherein stop words or stop words and punctuation are used as delimiters to locate raw phrases to be selected.

5. A method of generating a plurality of human intelligible keywords from an electronic, stored document including phrases, stop words delimiting the phrases, and punctuation, the method comprising the steps of:

a) providing a plurality of parameter values relating to weights and determined through a process of training;

b) using a computer to select from the document, raw phrases comprised of one or more contiguous words excluding stop words, and, c) using a form of the raw phrases, generating the plurality of human intelligible keywords by evaluating the selected raw phrases in dependence upon the parameter values used for weighting in order to determine a measure of human intelligible keyword significance, how closely a human intelligible keyword reflects the electronic, stored document.

6. A method of generating a plurality of human intelligible keywords from a document as defined in claim 5, wherein the step of selecting raw phrases is performed in the absence of at least one of a lexicon of target human intelligible keywords and part of speech tagging.

7. A method of generating a plurality of human intelligible keywords from a document as defined in claim 5, wherein the step of selecting raw phrases is performed in the absence of a lexicon of target human intelligible keywords and part of speech tagging.

8. A method of generating a plurality of human intelligible keywords from a document as defined in claim 5, wherein the step of training comprises the steps of:
   c) providing a training document;
   d) providing a set of human intelligible keywords that are dependent upon the training document;
   e) providing a set of weights that are independent of the training document;
   f) performing steps (a) and (b) on the training document;
   g) comparing the generated human intelligible keywords with the provided human intelligible keywords;
   h) until the comparison is within predetermined limits, adjusting the weights in dependence upon the comparison and iterating steps (f) through (h), wherein the values of the adjusted weights form the parameter values.

9. A method of generating a plurality of human intelligible keywords from a document as defined in claim 5, wherein the step or training comprises the steps of:
   c) providing a plurality of training documents;
   d) providing sets of human intelligible keywords for each training document;
   e) providing a set of weights that are independent of the training document;
   f) performing steps (a) and (b) on the training documents;
   g) comparing the human intelligible keywords generated for each document with the human intelligible keywords provided for said document;
   h) until the comparisons are within predetermined limits, adjusting the weights in dependence upon the comparisons and iterating steps (f) through (h), wherein the values of the adjusted weights form the parameter values.

10. A method of generating a plurality of human intelligible keywords from a document as defined in claim 9, wherein the training is performed using a genetic algorithm.

11. A method of generating a plurality of human intelligible keywords from a document as defined in claim 5, comprising the step of determining an ordering of the human intelligible keywords in dependence upon training data sets independent of the document.

12. A method of generating a plurality of human intelligible keywords from a document as defined in claim 11, wherein the step of determining an ordering is based on an evaluation of a plurality of indicators for each key word, and wherein each indicator is weighted with a weighting factor, similar indicators evaluated for different human intelligible keywords using a same weighting factor.

13. A method of generating a plurality of human intelligible keywords from a document as defined in claim 5, wherein the plurality of weighted criteria forms a decision tree.

14. A method of generating a plurality of human intelligible keywords from a document as defined in claim 5, further comprising the step of stemming words within selected phrases by truncating the words to a predetermined number of characters.

15. A method of generating a plurality of human intelligible keywords from an electronic, stored document including phrases, stop words delimiting the phrases, and punctuation, the method comprising the steps of:
   aa) providing a plurality of indicators and a weight associated with each of the indicators, each indicator and associated weight indicative of word/phrase significance within the document;
   a) generating a list of words within the document that are not stop words for determining a score in dependence upon an evaluation of each word of the list in dependence upon the plurality of indicators and the associated and same weights for each indicator, scores for different words in the list determined using same indicators and same weights;
   b) ordering the list of words in dependence upon scores; contiguous words excluding stop words: and,
   c) for each word in the list, selecting all raw phrases of one or more words containing a word having a predetermined similarity for determining a score for each selected raw phrase; and,
   d) replacing said word in the list with a most desirable word/phrase comprising a word having a predetermined similarity.

16. A method of generating a plurality of human intelligible keywords from a document as defined in claim 15, comprising the steps of:
   aa) stemming each word in the first list by the ordered steps of selecting a number of characters; and truncating words within the raw phrases to a length corresponding to the selected number of characters;
   dd) stemming each word in each selected word phrase;
   ff) unstemming the word phrases in the list of replaced word stems.

17. A method of generating a plurality of human intelligible keywords from a document as defined in claim 16, comprising the step of selecting at most a predetermined number of different words from the list of words.

18. A method of generating a plurality of human intelligible keywords from a document as defined in claim 16 comprising wherein the step of replacing said word comprises the step of removing duplicate word phrases from the list of replaced words.

19. A method of generating a plurality of human intelligible keywords from a document as defined in claim 15 wherein at least one of steps (b) and (e) is performed in dependence upon a plurality of weighted criteria, the weights determined by a step of training.

* * * * *